US012612581B2

(12) United States Patent
Floridia

(10) Patent No.: US 12,612,581 B2
(45) Date of Patent: Apr. 28, 2026

(54) METHOD OF TREATMENT OF GRAPES BY PULSED GAS INJECTION

(71) Applicant: PARSEC S.r.l., Florence (IT)

(72) Inventor: Giuseppe Floridia, Florence (IT)

(73) Assignee: PARSEC S.r.l., Florence (IT)

( * ) Notice: Subject to any disclaimer, the term of this patent is extended or adjusted under 35 U.S.C. 154(b) by 950 days.

(21) Appl. No.: 17/871,782

(22) Filed: Jul. 22, 2022

(65) Prior Publication Data

US 2022/0372413 A1 Nov. 24, 2022

Related U.S. Application Data

(63) Continuation of application No. 16/741,352, filed on Jan. 13, 2020, now Pat. No. 11,427,795, which is a continuation of application No. 15/521,487, filed as application No. PCT/IB2015/058506 on Nov. 3, 2015, now Pat. No. 10,563,157.

(30) Foreign Application Priority Data

Dec. 2, 2014 (IT) .......................... PO2014A000010

(51) Int. Cl.
*C12G 1/032* (2006.01)
*B01F 33/40* (2022.01)
*C12G 1/02* (2006.01)

(52) U.S. Cl.
CPC .......... *C12G 1/0216* (2013.01); *B01F 33/408* (2022.01); *C12G 1/02* (2013.01); *B01F 33/403* (2022.01)

(58) Field of Classification Search
CPC ........ B01F 33/403; B01F 33/408; C12G 1/02; C12G 1/022; C12G 1/0216; C12G 11/00
See application file for complete search history.

(56) References Cited

U.S. PATENT DOCUMENTS

| | | | | | |
|---|---|---|---|---|---|
| 3,357,476 | A | * | 12/1967 | Tofflemire | C11D 3/40 |
| | | | | | 159/48.1 |
| 4,336,329 | A | * | 6/1982 | Hesse | C12N 1/00 |
| | | | | | 422/298 |
| 4,593,611 | A | * | 6/1986 | Bruch | C12G 1/0213 |
| | | | | | 426/15 |
| 4,711,785 | A | * | 12/1987 | Bruch | C12G 1/0213 |
| | | | | | 426/15 |
| 4,773,315 | A | * | 9/1988 | Enenkel | C12M 41/44 |
| | | | | | 99/323.12 |
| 6,125,736 | A | * | 10/2000 | Marin | C12G 1/02 |
| | | | | | 435/813 |
| 6,631,732 | B1 | * | 10/2003 | Koster | C12G 1/0216 |
| | | | | | 99/277.1 |
| 7,282,141 | B2 | * | 10/2007 | Koopmans | C02F 3/20 |
| | | | | | 210/150 |

(Continued)

*Primary Examiner* — Brian W Jennison
(74) *Attorney, Agent, or Firm* — UNDERWOOD AND ASSOCIATES, LLC

(57) ABSTRACT

A method and a device for air injection into a vinification tank (1) use air injection nozzles (2) installed therein. A rule is applied for automatic variation of injections with time, by a coordinated and combined action of the nozzles, so that for each of the installed nozzles the delivered air jets may be modulated in duration and frequency and combined with the jets delivered by the other nozzles according to a programmable sequence.

20 Claims, 6 Drawing Sheets

(56)     References Cited

U.S. PATENT DOCUMENTS

| | | | | |
|---|---|---|---|---|
| 8,323,498 | B2 * | 12/2012 | Jenkins | C02F 3/302 |
| | | | | 210/150 |
| 8,708,065 | B2 * | 4/2014 | Largent | B09C 1/02 |
| | | | | 175/208 |
| 9,260,681 | B2 * | 2/2016 | Crosato | C12M 23/36 |
| 9,567,245 | B2 * | 2/2017 | Jenkins | C02F 3/302 |
| 2002/0174855 | A1 * | 11/2002 | Djordjevic | F02M 59/06 |
| | | | | 123/458 |
| 2006/0110491 | A1 * | 5/2006 | Parks | C12G 1/02 |
| | | | | 426/11 |
| 2006/0254977 | A1 * | 11/2006 | Koopmans | C02F 3/30 |
| | | | | 210/615 |
| 2006/0254979 | A1 * | 11/2006 | Koopmans | C02F 3/20 |
| | | | | 210/220 |
| 2007/0196535 | A1 * | 8/2007 | Francia | C12G 1/0216 |
| | | | | 426/11 |
| 2009/0279381 | A1 * | 11/2009 | Koopmans | B01F 33/406 |
| | | | | 366/106 |
| 2012/0241045 | A1 * | 9/2012 | Aouad | B01F 35/1453 |
| | | | | 141/83 |
| 2015/0184594 | A1 * | 7/2015 | Stammen | F23R 3/28 |
| | | | | 60/734 |
| 2016/0236140 | A1 * | 8/2016 | Northrop | C10L 3/103 |
| 2017/0313964 | A1 * | 11/2017 | Ghidi | C12G 1/02 |

* cited by examiner

METHOD OF TREATMENT OF GRAPES BY PULSED GAS INJECTION

CROSS-REFERENCE TO RELATED APPLICATIONS

Continuation-in-part of U.S. patent application Ser. No. 16/741,352, filed 13 Jan. 2020, which is a continuation of U.S. patent application Ser. No. 15/521,487, a national-stage application of PCT/IB2015/058,506, filed 3 Nov. 2015, which claims benefit of Serial No. PO2014A000010, filed 2 Dec. 2014 in Italy and which applications are incorporated herein by reference. To the extent appropriate, a claim of priority is made to each of the above disclosed applications.

TECHNICAL FIELD

The present invention generally addresses the field of plants and equipment for the wine industry and particularly relates to a method of controlled air injection into a vinification tank. The invention also relates to a device for implementing said method.

PRIOR ART

As is known, in the process of fermentation on skins, once the tank has been filled with crushed red grapes, and as soon as fermentation starts, the skins separate from the liquid. The skins are pushed up by the carbon dioxide released upon conversion of sugar into alcohol and form a very compact layer above the liquid, which is known as "cap". Therefore, a few hours after the start of fermentation, the vinification tank will contain an underlying liquid and a compact semi-solid over the liquid.

The cap must be frequently disaggregated for extraction of valuable components (polyphenols and aromatic compounds), by leaching the skins with the liquid as non-aggressively as possible to avoid skin trituration.

Arrangements have been long known and implemented in various technical fields (waste treatment, wastewater treatment, beverage and fruit juice storage, oil storage, etc.), for mixing the contents of large- and medium-size tanks by injecting air therein from below. Nevertheless, such technique has been rarely used in the wine industry for breaking and hence wetting the cap formed above the liquid during fermentation of red must.

Different techniques have been preferred heretofore, such as spraying the cap using a pump and a sprinkler, mechanical punch down, which consists in pushing the skins into the liquid using a plate, delestage, which consists in extracting part of the liquid by pumping it into a temporary tank, and pouring it back into the vinification tank using a disperser.

Air injection is rarely used for mixing in the process of fermentation on skins, because a tank containing must for fermentation on skins has problems completely differing from those of any other tank containing liquid to be mixed, and such technique cannot ensure quick, effective and extensive disgregration of the cap and wetting of skins, without causing undesired side effects such as the formation of dregs.

Prior art air injection devices for use in the wine industry are basically composed of a compressed air and/or inert gas generation and/or storage system, an air distribution system composed of pipes, fittings, filters and valves, the latter being controlled manually or through a programmable-logic control (PLC) system, and an air injection system using nozzles that are designed to be located in the vinification tank.

Traditionally, the oldest technical arrangement consists of a tubular rod having a manual cock and connected to the compressed air generation system. The rod is introduced into the tank from the top, through the cap, or from the bottom through a valve, whereupon the cock is manually opened and closed after a few seconds. The pressurized air flow introduced into the liquid creates a strong local turbulence which rises to the surface and partially breaks the cap.

This arrangement is problematic in that a manual (or even timer-operated) generation of a continuous air jet may provide a rather violent jet and yet cannot break the entire cap unless this operation is repeated many times with the rod in various positions (which is only possible, moreover, if the rod is introduced from the top).

The effectiveness of this arrangement has been improved by variable-frequency pulsed air injection. In other words, the frequency of jets may be adjusted according to the desired effect, i.e. 10 jets per minute, 20 jets per minute and the like. The frequency may be manually adjusted by the user according to the effect that the user is observing and to the change he/she makes to obtain something different at the time of operation. This improves effectiveness while limiting air consumption.

Nevertheless, the problem of these solutions is that they are not susceptible to automation, but always require a manual action by an operator to introduce the tubular rod into the tank, to observe the result of air injection and to manually change the position of the rod and the frequency of air pulses for entirely wetting the cap. This results in long application times and requires the use of skilled personnel to repeat the operation 4-8 times a day for each tank.

For automated air injection, liquid stirring techniques have been used for the must. In these techniques, nozzles are positioned on the bottom of the tank, and their number is proportional to the size of the tank. These nozzles have such construction that, under pulsed air control, they create bubbles that rise to the surface, mix the liquid content and partially wet the cap.

When the number of nozzles is small, all the nozzles are actuated at the same time. In large tanks, the nozzles are arranged in concentric circles and are actuated by alternating the center and the odd circles with the pair circles.

Nevertheless, this is not an optimal arrangement, because if the nozzles are located proximate to the bottom of the tank, then the tank emptying operation at the end of fermentation for marc extraction becomes very complicated.

This "racking" operation at the end of fermentation consists in emptying first the liquid and then the solid from the tank. Once the liquid has been emptied, the cap deposits on the bottom and easy removal thereof requires the bottom to be free of obstacles.

In view of facilitating this operation, most of the tanks used for fermentation on skins are equipped with a rotating extraction blade on the bottom of the tank which pushes the solid toward an emptying door, once the liquid has been emptied, thereby avoiding the need for operators to enter the tank and manually push the marc toward the door using blades or other tools.

In lieu of the extraction blade, a tank with a centered or off-center conical bottom (a slant-bottom tank) is sometimes used for the marc to be removed by gravity (self-emptying tanks). Only in this case, the provision of nozzles on the bottom of the tank is not problematic.

Nevertheless, the effect of bubbles rising to the surface, as described above, is not adequate for breaking and wetting the cap, especially in tall and narrow large-capacity tanks, having a cap as high as 2-3 m. In this case, bubbles are not able to disgregate and wet the entire cap.

A satisfactory cap wetting result can be only obtained with long treatment times and a huge air flow. For this reason, all the above methods involve the problem of stripping of flavors and alcohol, as they are partially carried away by the air flow. Thus, this arrangement eventually results in a negative effect, as it involves a flavor and alcohol loss.

AU2004101059 discloses an apparatus for injecting air into a vinification tank, comprising an injector for injecting air into the tank, associated with a central controller. The tank may contain multiple nozzles, equipped with check valves, which are part and are fed by the same injector. An array of vinification tanks may be also provided, each tank being equipped with its own air injector, which may be independently controlled by the injector of another tank, through the central controller. As a result, each tank may undergo a different air injection cycle, with an injection duration and an injection frequency other than those of another tank. Nevertheless, the nozzles of each tank operate according to the same air injection cycle, which may have variable injection durations and frequencies, provided that this variability applies to all the nozzles in the tank at the same time.

FR2797271 discloses an apparatus for thermovinification (at 50-80° C.), in which maceration lasts from 30 to 60 minutes, and a conical-bottom tank is provided, with a cylindrical compressed-air distributor thereunder, having compressed-air nozzles on its side wall. The injection of compressed air through the distributor, which is controlled by a solenoid valve operated by a regulator device, has the purpose of creating a convection stream for homogenizing the mixture and enhancing the diffusion of flavors, colors and useful substances (tannins, anthocyans) of the solid elements into the must.

U.S. Pat. No. 4,593,611 discloses a device for controlling vinification temperature, comprising heating means and cooling means external to the vinification tank, for circulation of the must therein according to a given sequence. The thermally-treated must is reintroduced into the tank through distribution nozzles. The circulating must is aerated by injection of compressed air into the circulation conduit, under the control of an on-off valve.

DISCLOSURE OF THE INVENTION

The general object of the present invention is to provide a method of controlled air injection into a vinification tank that can obviate the drawbacks as noted above in prior art air injection methods.

A particular object of the present invention is to provide a method of the above mentioned type, affording air injection intensity control to adapt the effect on the cap to the type of grapes and to the fermentation stage, for more or less delicate disgregration of the cap.

Another object of the present invention is to provide a method of the above mentioned type which uses a relatively small amount of air to generate shock waves that can disgregrate the cap and then cause it to be entirely flooded after a few seconds with no violent action that might have a skin-triturating effect.

A further object of the present invention is to provide a method of the above mentioned type in which the flavor and alcohol stripping problems of prior art methods are considerably reduced.

Yet another object of the present invention is to provide a device for implementing the method of the invention.

According to an important feature, the invention provides a new way of injecting air into a vinification tank, with the application of a rule for automatic variation of injections with time, by a coordinated and combined action of the nozzles, which means that the delivered air jets or pulses may be modulated in duration and frequency and combined, according to a programmable sequence, with the jets delivered by the other nozzles.

In other words, each nozzle in the tank is fed and actuated independently of the other nozzles in the same tank, but all nozzles are coordinated by a program that controls both air delivery from each nozzle to change the duration and frequency of the air jet with time according to a specific predetermined modulation, and the delivery sequence of all the nozzles, which may be actuated one after another or in a partially overlapping manner, and even at the same time, with equal or different jet durations and frequencies.

According to particular embodiments of the invention, the nozzles operate in turn, one after the other, in alternating or partially overlapping fashion, and each nozzle may be controlled to deliver modulated, intermittent air jets, particularly having a constant, increasing or decreasing duration, and either a constant frequency or a frequency that can be varied in predetermined or programmable ways.

According to another important characteristic, the invention provides a device for air injection into a vinification tank, comprising at least three nozzles for injecting compressed air delivered through an air distribution circuit having valves thereon for controlling the air flow directed to each nozzle and microprocessor means acting upon said control valves. The air injection nozzles are installed in the tank at a level not higher than one third of the total height of the tank, and the microprocessor means are programmable to actuate the control valves independently of one another to vary, according to a predetermined modulation rule, the frequency and duration of the air jets delivered by each nozzle and the delay time of each nozzle relative to the next one in the nozzle actuation sequence.

These and other features and the advantages of the method of controlled air injection into a vinification tank and the apparatus for implementing said method according to the invention will be apparent from the following description of certain embodiments thereof, which is given by way of example and without limitation with reference to the annexed drawings.

EMBODIMENTS OF THE INVENTION

Figures 1A, 1B, 2A, 2B:
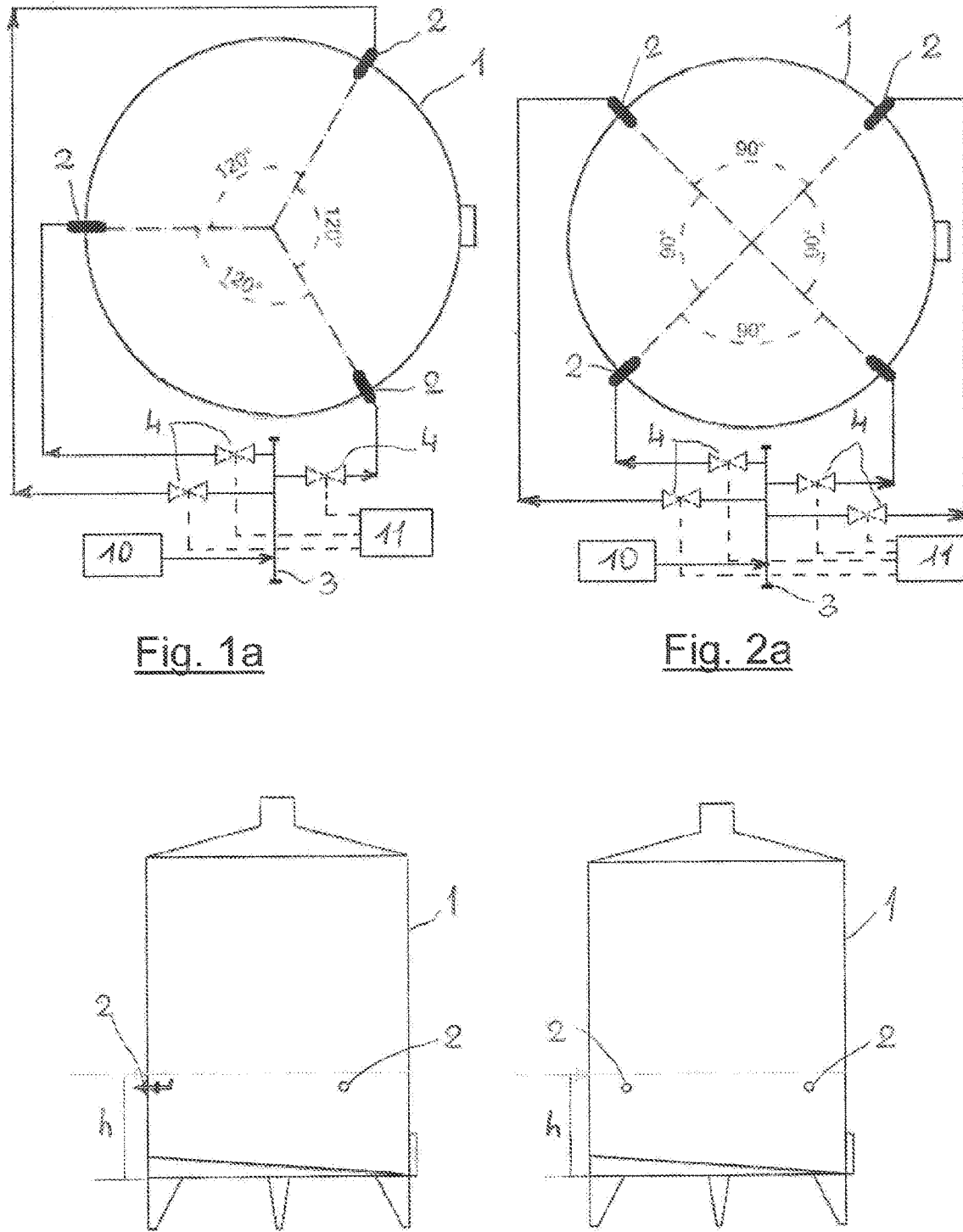
FIGS. 1a and 1b are schematic sectional and side elevation views of a vinification tank equipped with an air injection device according to a first variant embodiment.
FIGS. 2a and 2b are schematic sectional and side elevation views of a vinification tank equipped with an air injection device according to a second variant embodiment.

Referring now to FIGS. 1a, 1b and 2a, 2b, numeral 1 generally designates a vinification tank having at least three nozzles 2 on its side wall, for injecting air into the liquid mass (must) contained in the tank 1, as will be better explained hereinbelow. FIGS. 1a and 1b show a vinification tank 1 equipped with three air-injection nozzles 2, whereas FIGS. 2a and 2b show a vinification tank 1 equipped with four air-injection nozzles 2.

The nozzles 2 are equally spaced and placed at a height h from the bottom of the tank 1, which does not exceed one third of the total height of the tank. The nozzles 2 are also connected to a compressed-air generating system 10 of conventional type, only schematically shown, through a compressed-air distribution circuit, generally referenced 3, comprising distinct supply lines for each nozzle, with es 4 installed thereon for control and regulation of the air flow supplied to each of the nozzles 2.

Microprocessor means 11 are further provided, which can be programmed to control and regulate, through the valves 4, the air flow injected into the tank 1 through each of the nozzles 2 according to a predetermined program for controlling the modulation of the air jet durations and frequencies and the nozzle operation sequence, as described below.

Figure 6:
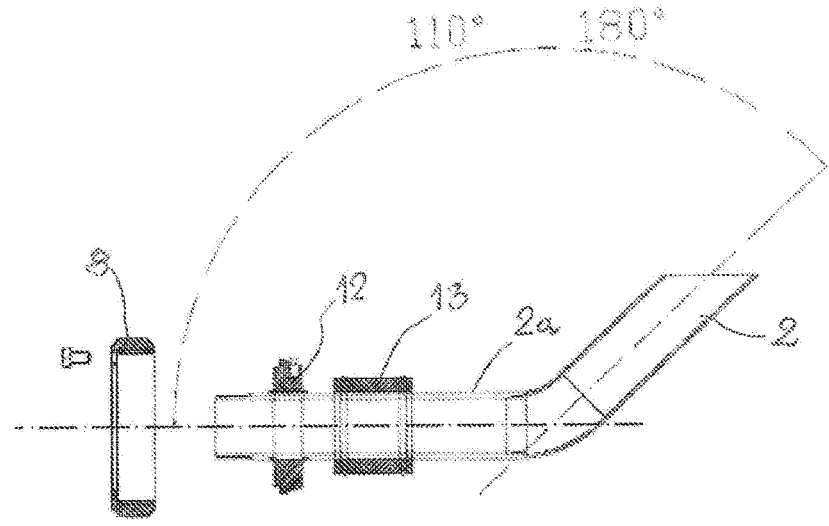
FIGS. 6 and 7 show construction details of a nozzle that can be removed from the outside.

As further shown in greater detail in FIG. 6, in the preferred embodiment of the invention, the nozzles are substantially shaped like a wide L and particularly their outlet forms an angle of 110° to 180° with the perpendicular to the side wall of the tank from which the nozzle inwardly projects.

The optimal angle of the nozzle is selected according to the selected positioning height of the nozzles and their distance from the cap. For example, if the nozzles 2 are installed on the side wall of the tank 1 an angle of divergence ranging from 115° to 170° shall be deemed adequate and an angle ranging from 115° to 150° is preferred.

Figure 3:
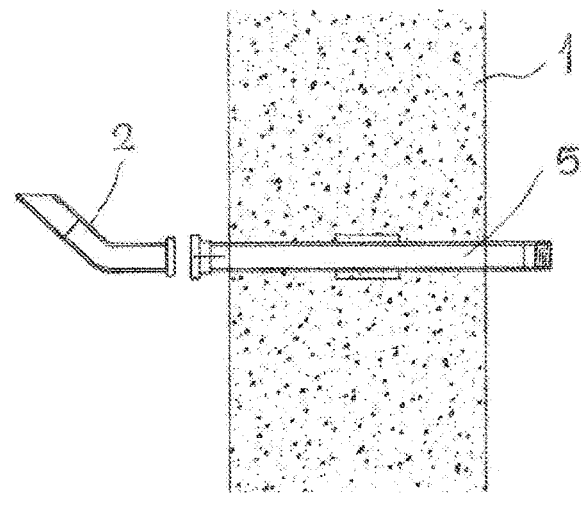
FIG. 3 shows a detailed lateral sectional view of a side wall of a concrete vinification tank with a nozzle of the air injection device of the invention mounted thereon.

FIG. 3 shows an air injection nozzle 2 mounted to the side wall of a concrete tank. Here, the nozzle 2 is mounted from the inside of the tank by a screw or a snap-fit connection, or another suitable system, at the end of a sleeve 5 embedded in the tank wall and connected in turn, by its outer end, to the air distribution circuit.

Figure 4:
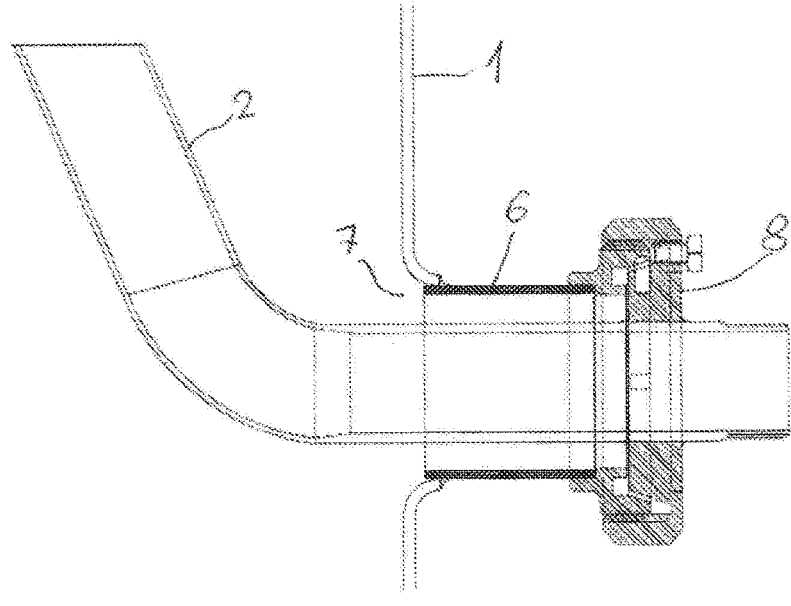
FIG. 4 shows a side view of a nozzle installed on the outer side of the sidewall of a steel vinification tank.

FIG. 4 shows a first way of mounting an air injection nozzle 2 to the side wall of a steel tank. Here, the nozzle is mounted from the outside by fitting it through a sleeve 6 welded within a corresponding hole 7 formed in the wall of the tank 1 and by fixing it to the sleeve 6 by means of an outer connecting ring nut 8.

Figure 5:
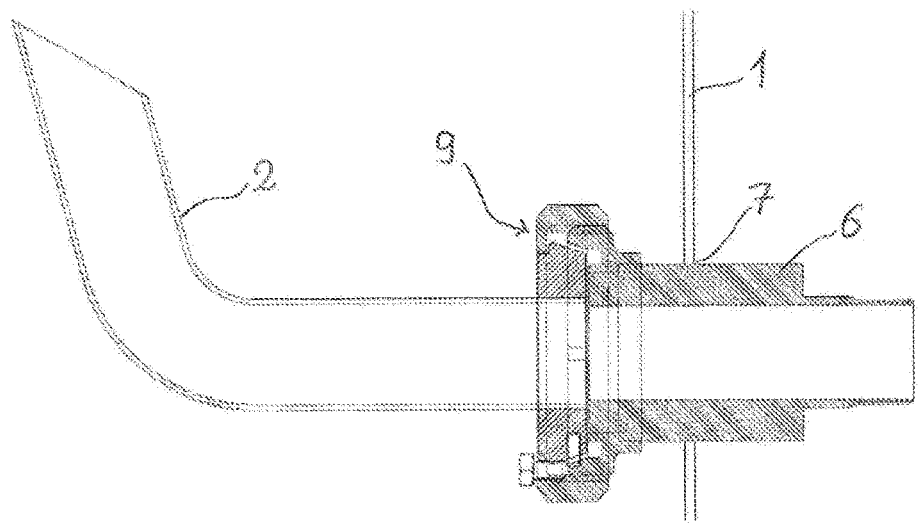
FIG. 5 shows a side view of a nozzle installed on the outer side of the sidewall of a steel vinification tank.

FIG. 5 shows a second way of mounting an air injection nozzle 2 to the side wall of a steel tank. Here, the nozzle is mounted from the inside by inserting it into a sleeve 6 welded within a corresponding hole 7 formed in the wall of the tank 1 and by fixing it to the sleeve 6 by means of an inner connecting ring nut 9.

Figure 7:
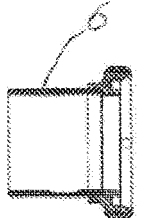

FIGS. 6 and 7 show the detailed construction of a nozzle 2 with all the parts required for mounting it to a vinification tank 1 from the outside, and particularly the sleeve 6 to be welded into the hole 7 of the tank 1 and the connecting ring nut 8 designed for cooperation with a ring 12 which is rigidly joined to the shaft 2a of the nozzle for fixing the nozzle to the tank wall. Advantageously a cylindrical block, e.g. made of Teflon, may be also provided with an antifouling purpose between the shaft of the nozzle 2 and the sleeve 6, as shown in FIG. 6 and referenced 13.

According to an important aspect, the present invention provides an original method of injecting air through the above described nozzles 2, which affords optimized disgregration and thorough wetting of the cap.

The nozzle are sequentially actuated with a modulated delay time between one nozzle and the next. Furthermore, the duration and frequency of the air jets or pulses of each nozzle may be modulated independently of the other nozzles in the tank. Due to the particular combination of the two modulations (duration and frequency on the one side and sequence on the other) a relatively small amount of air can generate shock waves that disgregate the cap and later cause it to be entirely flooded.

The sequence modulation and the jet duration and frequency modulation, as well as their combination, may be programmed and modified to obtained various action intensities, such that their effect on the cap may be adapted to the type of grapes and the fermentation stage (pre-fermentation, start, tumultuous, end, etc.).

Air is injected periodically multiple times a day, with timings selected by the operator as needed and based on his/her experience and for each nozzle, according to the present invention, in cyclic mode, i.e. the nozzles undergo one or more cycles of intermittent jets of programmed duration and frequency and are operated according to a sequence, also programmed, which may involve total alternation of the cycle of one nozzle to that of the previous one, or partial overlapping of the cycles of the two successively operated nozzles.

The operating pressure of compressed air generally ranges from 2 to 7 bar. The minimum duration of each air jet is 100 ms and its maximum duration is 15 seconds.

The following examples, which are given with reference to FIGS. 8 to 13 show a few possible nozzle control modes, although it shall be intended that a number of additional modes may be selected by the skilled person as needed.

Example 1

Medium Action

Figure 8:
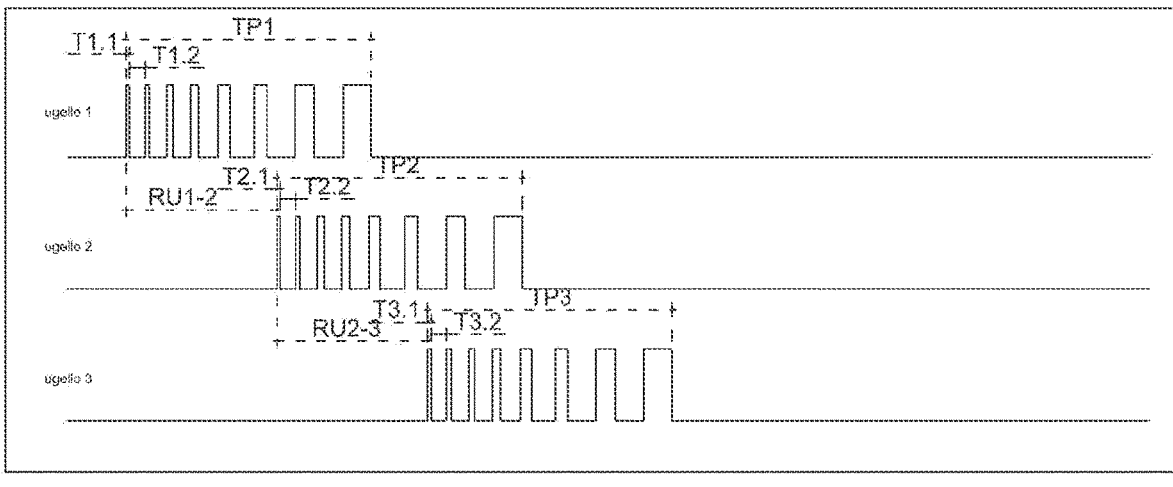
FIGS. 8 to 13 show graphic examples of time modulation of air injection from the nozzles according to a controlled air injection method of the present invention.

A medium-intensity air injection action of the nozzles is desired. Referring to FIG. 8, the nozzles are operated to obtain an increasing modulation, i.e. with intermittent jets of increasing duration. Namely, the nozzles are actuated in turn, one after the other.

The second nozzle starts a time [RU1-2] after the start of the first nozzle. The third nozzle starts a time [RU2-3] after the start of the second nozzle. Since the second nozzle starts when the first nozzle is still operating, a crossed combination is obtained.

Each nozzle is associated with a preset automatic frequency variation (modulation). Here, there is an increasing modulation as both pause times and actuation times increase. In a variant embodiment, only the pause time or the actuation time may be increased. This nozzle control mode generates a rotation moment in the fluid, which amplifies the crumbling effect to the entire cap.

Example 2

Mild Action

Figure 9:
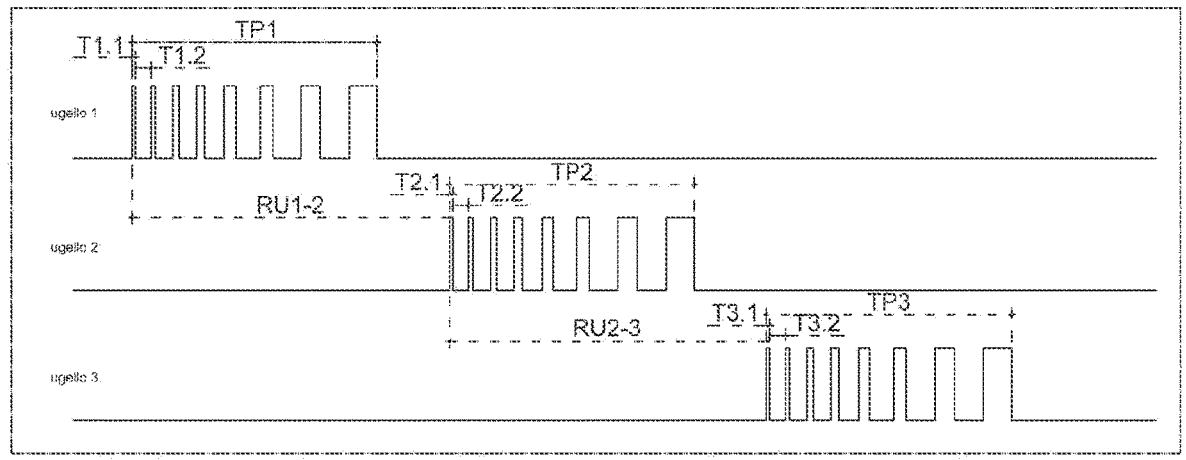

A milder-intensity air injection action from nozzles is desired, as compared with the mode as described under Example 1. Referring to FIG. 9, this modulation is identical to the previous one concerning the individual nozzles, but nozzle actuations do not overlap, which means that the next nozzle starts once the previous one has stopped (alternate combination). The effect of this operating mode is, as mentioned above, much milder than that obtained with the operating mode as described under Example 1, but is adequate in certain cases.

Example 3

Holding Action

Figure 10:
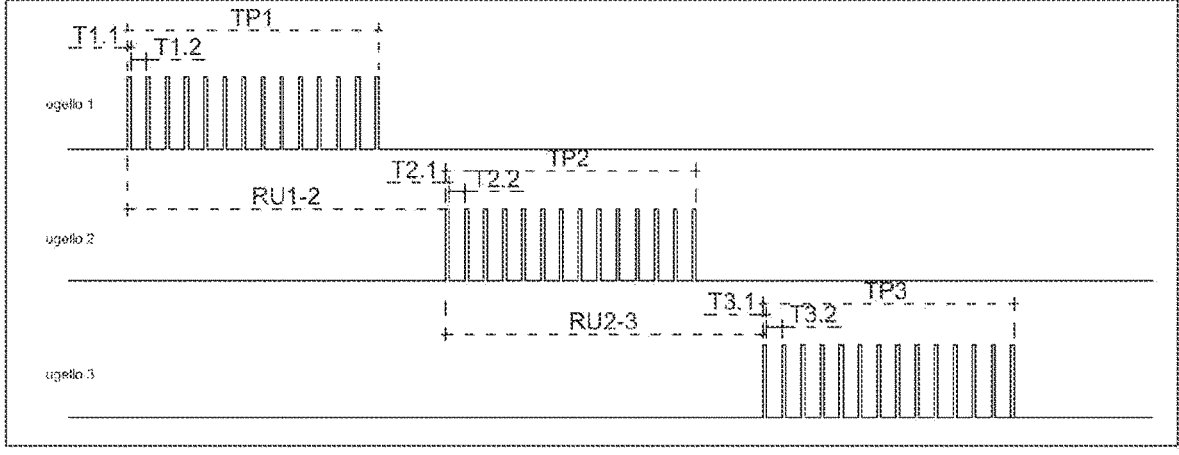

This nozzle control mode, as shown in FIG. 10 provides constant modulation with constant actuation times and constant pause times for each jet of each nozzle, as well as alternate combinations, with the nozzles never starting together but successively, one after the other. The effect of this operating mode is even milder than that of Example 2, and does not break the cap unless it has already broken by previous actions.

It shall be noted that this operating mode is similar to what can be implemented using a prior art device, with the significant, important difference that, in this example, multiple nozzles are actuated in turn, successively one after the other.

Example 4

Breaking and Wetting Action

Figure 11:
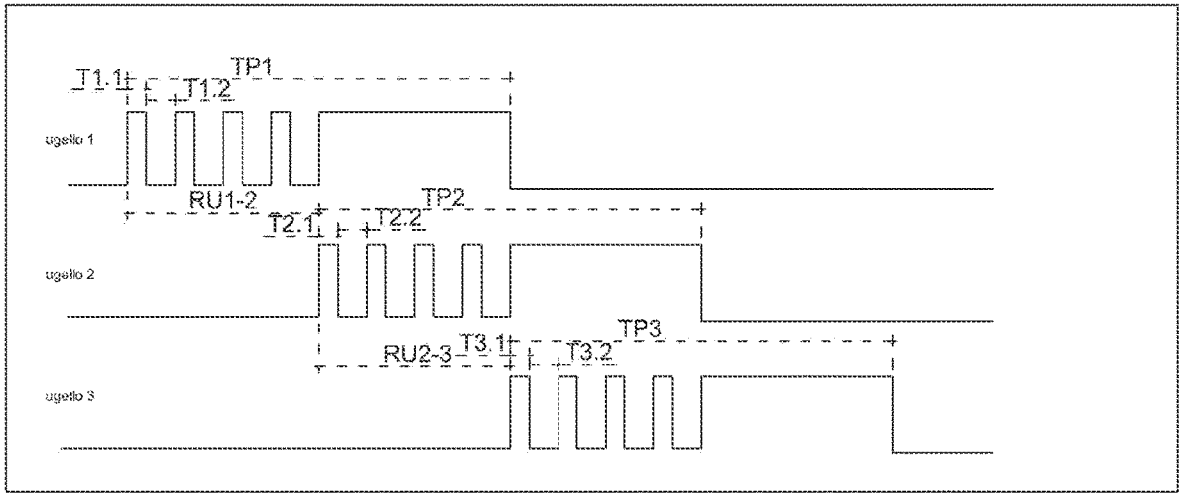
Figure 12:
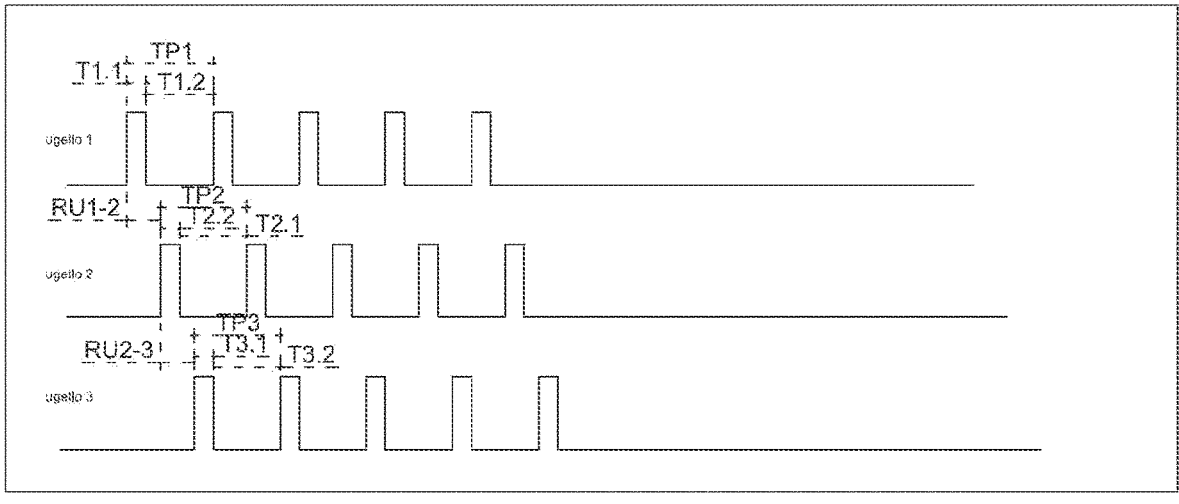

A combined crumbling and flooding effect on the cap is desired. Referring to FIG. 11, the nozzles are controlled to provide a two-step modulation, which means that each nozzle operates, in a first step, by pulsed injection of jets of constant duration, and in a second step by continuous injection. The nozzles are operated in crossed combination, i.e. the next nozzle starts when the previous nozzle has not stopped its operation yet.

Example 5

Cap Submerging Action

The desired action involves first gas stripping to support the cap and then lowering the cap into the liquid. Here (see chart of FIG. 12), a constant injection mode is provided, with intermittent air jets of constant duration, delivered in turn by each of the installed nozzles. In other words, the time interval between two successive jets of a nozzle is sufficient to cover a jet of each of the other nozzles. Once again this provides a very mild effect, which can only be used for the above mentioned purpose.

Example 6

Sustained Medium Action

Figure 13:
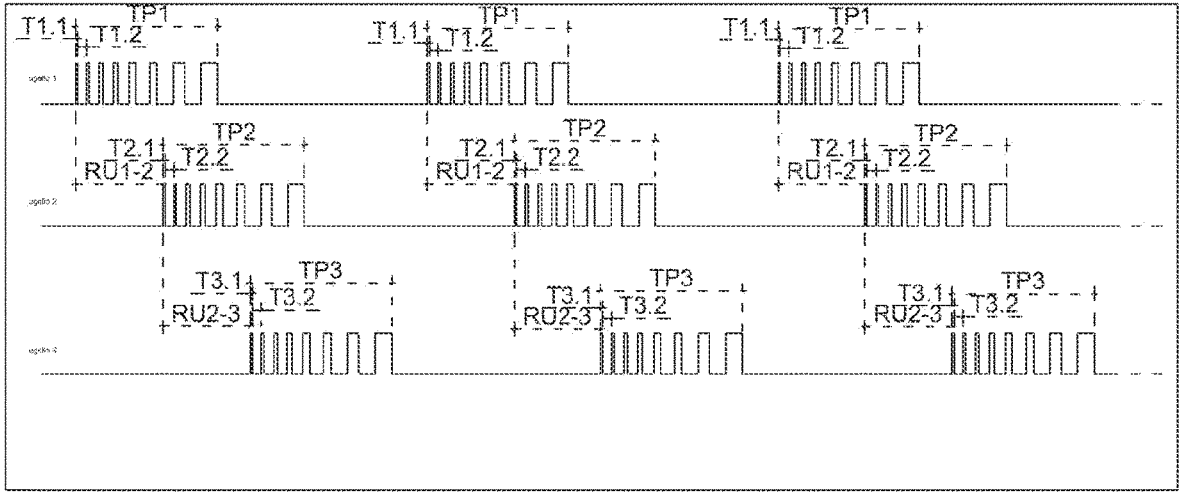

This operating mode, as shown in FIG. 13, is similar to that of Example 1, i.e. with increasing modulation and crossed modulation, but is repeated multiple times, here three times.

Therefore, the various modes may be summarized as follows:

A) Considering the jet of an individual nozzle:
  1) Increasing or decreasing modulation—single step:
      for an individual nozzle, the duration of actuation pulses and the duration of pause pulses increase or decrease respectively during the nozzle operating time.
  2) Constant modulation—single step:
      for an individual nozzle, both the duration of actuation pulses and the duration of pause pulses remain constant to a preset value throughout the nozzle operating time.
  3) Increasing-decreasing-constant modulation—two steps:
      like the previous cases, but with a continuous air injection of preset duration at the end of each jet of the nozzle.

B) Considering the sequence of nozzles
  1) Crossed combination
      the next nozzle starts when the previous nozzle has not completed its cycle yet.
  2) Alternate combination
      the next nozzle starts when the previous nozzle has already completed its cycle.

Each sequence may be performed once or repeated N times (see Example 5 in which the sequence is a succession of single actuations of each nozzle and this sequence is repeated 5 times, or Example 6, which is the same modulation as in Example 1, with repetition=3)

It shall be noted that each of the above examples is obviously a "punch down". Such punch down may be repeated N times a day.

The above disclosure clearly shows that the method of the present invention can fulfill the intended objects. Particularly, the various possible applications of a predetermined jet modulation rule for each nozzle and sequential nozzle combinations provide disgregrating waves which submerge and break the entire cap, thereby flooding it with liquid. This occurs within a few seconds and with no violent action.

Due to a high extraction potential and action times as short as a few seconds, the consumption of air or inert gas is minimized, and the problems associated with flavor- and alcohol-stripping are hence considerably reduced.

The modulated-sequential control mode has been also experimentally found to be effective even when nozzles are installed from the bottom, when this creates no hindrance (self-emptying slant-bottom tanks), thereby obviating the problems of similar prior art air-bubble systems.

Therefore, when allowed by the tank emptying and cleaning conditions, the nozzles may be also mounted to the bottom of the tank and vertically extend therefrom. In this case, they may extend in linear fashion, which means that the angle of divergence of the substantially L shape of the nozzles is 180°. Yet, nozzle control modes and air injection modulation are as defined by the above described and illustrated inventive method.

It shall be finally noted that, while reference has been always made herein to air as the fluid in use, any fluid that is functionally equivalent to air, e.g. an inert gas such as nitrogen, may be alternatively used, and in this sense the term air shall be intended, each time it is mentioned.

Variants and/or changes may be made to the method of controlled air injection into a vinification tank and to the associated device of the present invention, without departure from the scope of the invention, as defined in the following claims.

The invention claimed is:

1. A method treatment of grapes in a vinification tank provided with a side wall and a gas injection device, the gas injection device having:

a plurality of nozzles inwardly projecting from the tank side wall, for injecting compressed gas into the vinification tank, one or more control valves for controlling gas flow to the plurality of nozzles and into the same vinification tank; with each respective control valve controlling gas flow to at least one corresponding nozzle;

the method comprising:

independently actuating each control valve of the one or more control valves, and causing injection of compressed gas in the form of gas pulses injected into the vinification tank through said plurality of nozzles, wherein each respective control valve of the one or more control valves causes injection of gas pulses through at least one corresponding nozzle;

wherein each gas pulse has a duration between a minimum duration of 100 ms and a maximum duration of 15 s, and wherein at least three nozzles of said plurality of nozzles are activated in sequence with the at least three nozzles starting respective cycles of gas injection in turn, one after the other, wherein each cycle of gas injection through each nozzle comprises a plurality of gas pulses.

2. The method according to claim 1, wherein each of said nozzles of said plurality of nozzles has a nozzle outlet arranged at an angle of between 115° and 170° with respect to the perpendicular to the side wall, wherein said injection of compressed gas is upwardly directed.

3. The method according to claim 1, wherein the plurality of nozzles inwardly project from the tank side wall.

4. The method according to claim 1, wherein each cycle of gas injection through each nozzle of said plurality of nozzles is repeated multiple times per day.

5. The method according to claim 1, wherein the compressed gas has operating pressure ranging from 2 to 7 bar.

6. The method according to claim 1, wherein the method is executed after the steps of:

feeding the tank with crushed red grapes, allowing grape skins to separate from liquid to form a compact layer cap above the liquid, and wherein the plurality of injected gas pulses are configured to provide waves in the liquid which break the cap, flooding it with liquid.

7. A method treatment of grapes in a vinification tank with a gas injection device having:

at least three nozzles for the injection of compressed gas into the vinification tank, a distribution circuit including control valves for controlling gas flow to each nozzle;

the method comprising:

inserting grapes into the vinification tank, allowing grape skins to separate from liquid to form a cap above the liquid, independently actuating the control valves and cause injection of compressed gas in the form of gas pulses which are injected into the vinification tank through each one of said at least three nozzles, wherein said injection of compressed gas in the form of gas pulses comprises a cycle of gas injection through each of said at least three nozzles, each cycle of gas injection comprising gas pulses through each nozzle.

8. The method according to claim 7, wherein each gas pulse has a duration between a minimum duration of 100 ms and a maximum duration of 15 s; and wherein the compressed gas has operating pressure ranging from 2 to 7 bar.

9. The method according to claim 7, wherein each cycle of gas injection through each nozzle is repeated multiple times per day.

10. The method according to claim 7, wherein each of said cycles lasts a few tens of seconds to minimize gas consumption.

11. A method treatment of grapes using a vinification tank with a gas injection device having:

a plurality of nozzles for the injection of compressed gas into the vinification tank, a distribution circuit including one or more control valves for controlling gas flow to each nozzle;

wherein the method comprises:

actuating the one or more control valves, and causing injection of compressed gas in the form of gas pulses which are injected into the vinification tank through each one of said nozzles of said plurality of nozzles;

wherein the nozzles of said plurality of nozzles are activated in sequence with the at least three nozzles starting respective cycles of gas injection in turn, one after the other, such that cycles of subsequently activated nozzles are partially overlapping over time.

12. The method according to claim 11, wherein the compressed gas has operating pressure ranging from 2 to 7 bar and wherein each air jet has a duration between a minimum duration of 100 ms and a maximum duration of 15 s.

13. The method according to claim 11, wherein said one or more control valves are actuated independently of each other.

14. The method according to claim 11, wherein each cycle of gas injection comprises a plurality of gas pulses through each nozzle of said plurality of nozzles, and wherein each cycle of gas injection through each nozzle of said plurality of nozzles is repeated multiple times per day.

15. The method according to claim 11, wherein said one or more control valves are actuated such that frequency and duration of the gas pulses emitted by each nozzle of said plurality of nozzles, in a same cycle of gas injection, are constant.

16. The method according to claim 11, comprising the steps of:

feeding the tank with crushed red grapes, allowing grape skins to separate from liquid to form a compact layer cap above the liquid, and wherein the plurality of injected gas pulses are configured to form waves in the liquid which break the cap, flooding it with liquid.

17. A method treatment of grapes using a vinification tank with a gas injection device having:

a plurality of nozzles for the injection of compressed gas into the vinification tank, a distribution circuit including one or more control valves for controlling gas flow to each nozzle;

wherein the method comprises:

actuating the one or more control valves, and causing injection of compressed gas in the form of gas pulses which are injected into the vinification tank through each one of said nozzles of said plurality of nozzles;

wherein the nozzles of said plurality of nozzles are activated in sequence with the at least three nozzles, one after the other, and wherein cycles of subsequent activated nozzles are not overlapping such that a first cycle of a given nozzle starts a delay time after end of the first cycle of a preceding nozzle.

18. The method according to claim 17, wherein said one or more control valves are actuated independently of each other;

wherein each cycle of gas injection comprises a plurality of gas pulses through each nozzle of said plurality of nozzles, and wherein each cycle of gas injection through each nozzle of said plurality of nozzles is repeated multiple times per day.

19. A method treatment of grapes using a vinification tank with a gas injection device having:

a plurality of nozzles for the injection of compressed gas into the vinification tank, a distribution circuit including one or more control valves for controlling gas flow to each nozzle;

wherein the method comprises:

actuating the one or more control valves, and causing injection of compressed gas in the form of gas pulses which are injected into the vinification tank through each one of said nozzles of said plurality of nozzles;

wherein said one or more control valves are actuated such that the gas pulses emitted in a same cycle of gas injection, by each nozzle of the plurality of nozzles, comprises one or more of:

pulses of increasing duration, and pause times between consecutive pulses, said pause times presenting increasing duration.

20. The method according to claim 19, wherein said one or more control valves are actuated independently of each other;

wherein each cycle of gas injection comprises a plurality of gas pulses through each nozzle of said plurality of nozzles, and wherein each cycle of gas injection through each nozzle of said plurality of nozzles is repeated multiple times per day.

* * * * *